C. A. KRAUS.
JOINT.
APPLICATION FILED SEPT. 8, 1910.
1,046,084.
Patented Dec. 3, 1912.
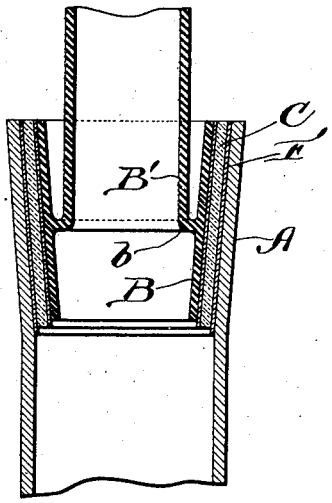
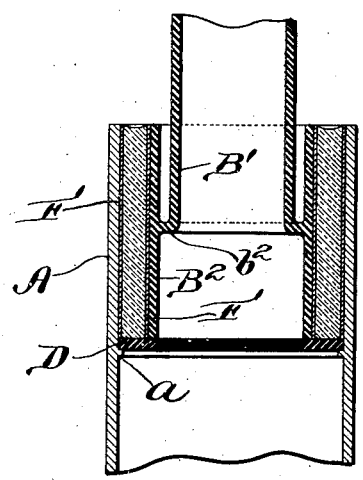
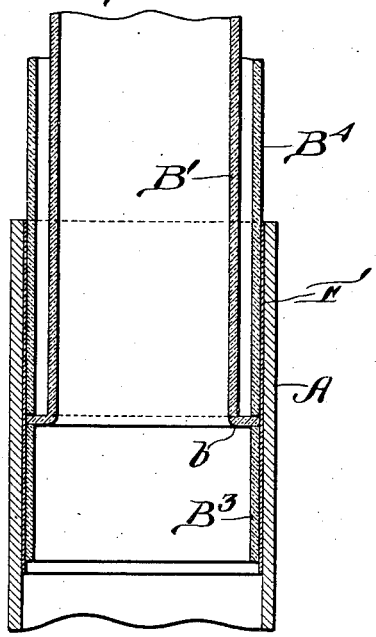
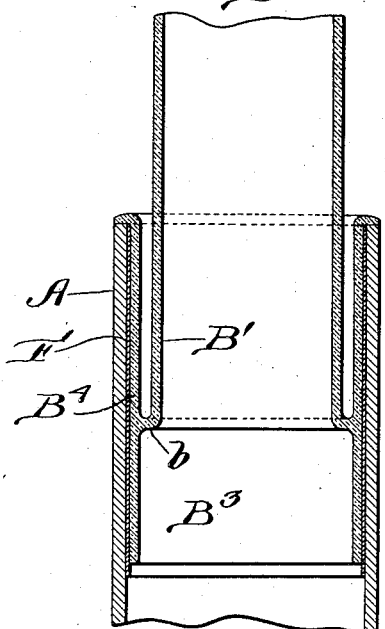

UNITED STATES PATENT OFFICE.

CHARLES A. KRAUS, OF NEWTON HIGHLANDS, MASSACHUSETTS.

JOINT.

1,046,084.   Specification of Letters Patent.   Patented Dec. 3, 1912.

Application filed September 8, 1910. Serial No. 581,004.

*To all whom it may concern:*

Be it known that I, CHARLES A. KRAUS, a citizen of the United States, and resident of Newton Highlands, in the county of Middlesex and State of Massachusetts, have invented new and useful Improvements in Joints, of which the following is a specification.

My invention relates to the construction of gas-tight joints whereof one of the members is metallic and the other of refractory insulating material being vitreous or semi-vitreous, such as glass, quartz or porcelain. Such insulating materials as a rule are characterized by a coefficient of expansion considerably smaller than those of metals.

A special object of my invention is to provide an insulating gas-tight joint for use with vacuum electric apparatus of which the container is composed of glass, or other refractory but fragile material, such a joint being required for the proper securement of electrode leads. For such purposes the union between the metallic and non-metallic members of the joint must be hermetically intimate and also capable of withstanding changes of temperature without undue stress or fracture. In order to guard against the production of dangerous stresses due to thermal change, my improved joint is made symmetrical first by arranging its several members concentrically with the insulating member on the inside and the metal member outside, and second by so forming the insulating member that the place of junction of the necessary extension thereof is placed at about the middle of the joint which is therefore symmetrically disposed on either side of this junction lengthwise of the joint.

As one of my objects in the contrivance and construction of joints of this character is to make practically possible the employment of a relatively cheap metal, such as steel, the hermetical closure of a joint into which such a metal enters requires the elimination of the oxid of the metal from that surface which is juxtaposed to other component members of the joint. For this purpose, as described in an application for Letters Patent filed concurrently herewith by me Serial No. 581,002 I prescribe the employment of a vitreous flux which is a solvent of the oxid of the metal to which it is applied, so that by fusing a glaze of such a flux over the surface of a metal member of such a joint, the oxid of the metal which is usually present and which will inevitably form when the metal is heated is thoroughly dissolved in the flux which thus cleanses the surface of the metal and makes intimate and hermetical contact with the metal itself as distinguished from the oxid thereof. Gas-tight joints involving one or more such metal members may be made in three specific modes, either by bringing the joint members together in concentric relation by a progressive pressure upon an intermediary which comprises such flux; or by constructing the joint with two concentrically arranged members spaced apart to form an annular receptacle into which a vitreous filler may be poured or cast, the metal surfaces of the joint having first been prepared by the application of such a flux as above specified, (this mode being described in another application filed concurrently herewith by me Serial No. 581,003) or the joint between a metallic and non-metallic insulating member may be made by blowing an inner vitreous insulating member into hermetical contact with an outer metal member, the surface of which has been previously prepared by coating with the said flux, a joint so constructed being described in another application concurrently filed herewith by me. But whether the joint be made by one or another of the above indicated specified modes, its structure may involve the symmetrical disposition of the parts with respect to thermally produced stresses which is the subject matter of this specification.

Thus, in the drawings hereto annexed which illustrate my invention,—Figure 1 shows in cross section a joint made by pressing concentrically disposed members into union with a suitable intermediary; Fig. 2 shows in cross section a joint made by pouring a suitable insulating intermediary between concentrically arranged tubular members; Fig. 3 shows the parts of a blown joint as the same are assembled in the process of construction; and Fig. 4 represents the finished blown joint.

In all the forms of joint illustrated by these drawings, the outer member is composed of metal and the inner member of insulating material, such as glass, quartz or porcelain, so that the structure presents an outer member having a relatively high and an inner member having a relatively low thermal coefficient of expansion.

In all the figures A represents the outer member which as a preliminary to the formation of the joint is coated with a vitreous flux F, which, as described in my concurrently filed application Serial No. 581,004, is a solvent of the oxid of the metal of which the member A is composed. Thus, nearly all practical constructions will be iron or steel. In the forms of joint shown in Figs. 1 and 2, a separator C composed of vitreous fusible material intervenes between the outer member A and the inner member of the joint, and this separator should be characterized by a thermal coefficient of expansion intermediate between that of the outer metal member and the inner insulating member of the joint. To be more specific, referring to Fig. 1 which shows what I term the pressed joint, the outer member A composed say of steel is given a conical flare at its end which corresponds in conicity with the inner member B and with the separator C, the inner member being say of porcelain and the separator being of a vitreous material whose coefficient of expansion is intermediate between that of steel and porcelain. Persons skilled in the manufacture and compounding of various glasses can readily provide a glass which possesses the desired coefficient of expansion. For the purpose of dissolving the oxid of the metal A and insuring conditions of intimate contact, a low-melting flux is applied hot to the interior of the flared conical end of the tube A, and preferably also, is applied to the exterior of the inner member B. This inner member B constitutes in effect a sleeve from the middle portion of which at $b$ there proceeds the integral tubular extension B'. The several component members are heated, the separator C introduced between the outer and inner members of the joint, and the several members then pressed endwise together so as progressively to squeeze out any bubbles of air which may interpose between the flux F and the surfaces applied thereto.

In making the joint shown in Fig. 2 the method described in my concurrently filed application Serial No. 581,003 is pursued. A plate D composed of refractory material, such as porcelain or earthen ware, is placed in the steel tube A resting upon a suitable support or ledge at $a$. The interior of the steel tube A is coated with a flux F solvent of the oxid of the metal of which the member A is composed, and the inner member $B^2$, which is, let us say, of porcelain, is then interposed and placed so as to rest upon the plate D, concentrically with the outer metal tube A. Preferably the interior of the tubular member $B^2$ is coated or glazed with a flux F similar to that applied to the metallic surface of the member A. The separator C is then formed by pouring or casting a melted glass of which the coefficient of expansion is intermediate between that of steel and porcelain, into the annular space between the member A and the member $B^2$. This member $B^2$ constitutes an inner sleeve from the middle portion of which at $b$ proceeds the tubular extension B'.

In Figs. 3 and 4 there are shown in process of construction and completed respectively a gas-tight joint formed by blowing. This specific form of joint is described herein to illustrate a feature which the said blown joint has in common with the pressed joint and the poured joint shown respectively in Figs. 1 and 2. Referring to Fig. 3, a steel tube A is prepared by being internally lined with a flux F. A short tube $B^3$ of glass is introduced into the tube A, heated and pressed outward into intimate contact with the flux F. This union of the tubular section $B^3$ with the flux F may be accomplished by the use of a graphite pencil. The tubular extension B' which has been flared at $b$ so as to fit within the internally glazed tube A and rest upon the end of the glass tubular section $B^3$ is then inserted. This tubular extension is composed of glass, preferably of the same composition as the tubular section $B^3$. Then the tube $B^4$ which is introduced into the top of the tube A is at first of such length as to extend beyond the end of the tube A. The entire joint is then heated to a temperature sufficient to produce fluidity in the flux F and a workable degree of plasticity in the glass members above described. The tube being heated as in the neighborhood of the flaring flange at $b$, the tube $B^4$ is pressed down upon the flange $b$ so that an intimate fused junction is made between $B^4$, $B^3$ and $b$. Then the heat applied to the exterior of the tube A is made to progress along the tube toward its outer end while the tubular section $B^4$ is blown outward against the flux F. Thus, all included air bubbles are progressively extruded at the top of the tube A until the outer portion of the tubular section $B^4$ is heated sufficiently to allow it to be blown out over the ends of the tube A where the surplus of glass is finally broken off when the joint is allowed to cool.

It will now be observed that in the instance above described, whether the joint be pressed, poured or blown, it is characterized by an outer metal and an inner insulating member, the latter comprising a sleeve disposed concentrically in relation to the outer member, and having a tubular extension which is joined to the sleeve at the middle portion of the latter. When the joint so constructed cools down the outer metal member exerts a contractile stress upon the inner member and this will be present in various degrees as the temperature of the joint is made to change. The concentric disposition of the main members in large measure guards against the production of internal stresses which endanger the joint, and further, the symmetrical disposition of the inner joint member on either side of the point where the tubular extension proceeds produces an equality of conditions on either side of said point, and thus eventually eliminates stresses exerted diagonally which might otherwise endanger the integrity of the insulating member of the joint.

What I claim and desire to secure by Letters Patent is:

1. In a gas-tight joint, the combination of an outer tubular, metal member, a concentrically placed, insulating inner member comprising a sleeve, and a tubular extension proceeding from a portion of the inside of the sleeve intermediate between the ends thereof, and an intermediary between the sleeve and the outer member, hermetically united to both.

2. In a gas-tight joint, the combination of an outer tubular, metal member, a concentrically placed, insulating member comprising a sleeve, and a tubular extension proceeding from a portion of the inside of the sleeve intermediate between the ends thereof, and an intermediary composed of material having a coefficient of expansion intermediate between those of the outer metal member and inner insulating member between the sleeve and the outer member, hermetically united to both.

3. In a gas-tight insulating joint, the combination of an outer tubular member, of oxidizable metal, a concentrically placed inner member comprising an insulating sleeve, and a tubular extension proceeding from a portion of the sleeve intermediate between the ends thereof, and an intermediary between the sleeve and the outer metal members comprising a flux solvent of the oxid of the metal member and in continuous hermetical contact with the metal of said outer member, said intermediary also hermetically and continuously joined to the inner sleeve.

4. In a gas-tight joint, the combination of an external tubular annulus of metal, an internal sleeve of vitreous material, an inner tubular extension of vitreous material proceeding from the inside of the internal sleeve intermediate between the ends thereof, and an intermediary flux solvent of the oxid of the metal of which the outer tube is composed in continuous fused hermetical contact with said metal and with said vitreous sleeve.

5. In a gas-tight joint, the combination of an external tubular member of metal, an internal sleeve of vitreous material, an inner tubular extension of vitreous material proceeding from the interior of the sleeve intermediate between the ends thereof, said sleeve fused into an hermetically sealed continuous contact with the outer metal tubular member.

6. In a gas-tight joint, the combination of an external tubular member of metal, an internal sleeve of vitreous material, an inner tubular extension of vitreous material proceeding from the inside of the internal sleeve intermediate between its ends, and an intermediary flux solvent of the oxid of the metal of which the outer tube is composed in continuous fused hermetical contact with said metal and with said vitreous sleeve.

7. In a gas-tight joint, the combination of an external conducting member, an inner non-conducting member making intimate joint with the outer member, and a tubular extension proceeding from the inside of the inner non-conducting member intermediate between the ends thereof.

Signed by me at Boston, Massachusetts, this second day of September, 1910.

CHARLES A. KRAUS.

Witnesses:
ODIN ROBERTS,
ROY D. MAILEY.